United States Patent
Xiong et al.

(10) Patent No.: US 8,416,593 B2
(45) Date of Patent: Apr. 9, 2013

(54) SWITCHING POWER SUPPLY WITH OVER-CURRENT PROTECTION AND ELECTRONIC DEVICE USING THE SAME

(75) Inventors: Yong Xiong, Shenzhen (CN); Yong-Song Shi, Shenzhen (CN); Yong Li, Shenzhen (CN); Tao Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 561 days.

(21) Appl. No.: 12/331,384

(22) Filed: Dec. 9, 2008

(65) Prior Publication Data

US 2009/0279334 A1    Nov. 12, 2009

(30) Foreign Application Priority Data

May 12, 2008    (CN) .......................... 2008 1 0301549

(51) Int. Cl.
*H02H 7/122*    (2006.01)
(52) U.S. Cl. .................... 363/56.03; 363/56.1
(58) Field of Classification Search .............. 363/52, 363/56.03, 56.1, 68, 50, 56.01
See application file for complete search history.

(56) References Cited

U.S. PATENT DOCUMENTS

| | | | | |
|---|---|---|---|---|
| 4,378,585 A * | 3/1983 | Bete | ................................. | 363/19 |
| 4,719,531 A | 1/1988 | Okado et al. | | |
| 4,785,229 A * | 11/1988 | Edwards | ........................ | 323/284 |
| 4,837,458 A * | 6/1989 | Kawahata et al. | ............. | 327/207 |
| 4,907,116 A * | 3/1990 | Aschwanden et al. | .......... | 361/18 |
| 4,975,823 A * | 12/1990 | Rilly et al. | .................. | 363/21.16 |
| 5,621,601 A * | 4/1997 | Fujihira et al. | ................ | 361/93.9 |
| 5,796,596 A * | 8/1998 | Williams | .................... | 363/21.16 |
| 5,812,383 A * | 9/1998 | Majid et al. | ................. | 363/21.05 |
| 5,835,361 A * | 11/1998 | Fitzgerald | ................. | 363/21.03 |
| 6,094,362 A * | 7/2000 | Domingo | ...................... | 363/56.1 |
| 6,269,011 B1 * | 7/2001 | Ohshima | ......................... | 363/50 |
| 6,456,511 B1 * | 9/2002 | Wong | .......................... | 363/21.13 |
| 7,006,365 B2 * | 2/2006 | Kitano | ........................ | 363/56.03 |

FOREIGN PATENT DOCUMENTS

| | | |
|---|---|---|
| CN | 2552047 Y | 5/2003 |
| CN | 101017973 A | 8/2007 |
| JP | 5-276761 A | 10/1993 |
| TW | 312869 | 8/1997 |

* cited by examiner

*Primary Examiner* — Adolf Berhane
*Assistant Examiner* — Gary Nash
(74) *Attorney, Agent, or Firm* — Altis Law Group, Inc.

(57) ABSTRACT

A switching power supply includes a rectifier circuit, a converter, a detecting unit, a control unit, a switching unit, and a protection unit. The rectifier circuit is used for rectifying an input voltage into a first direct current voltage. The converter is configured for generating a first current according to the first direct current voltage. The detecting unit is used for generating a detected voltage according to the first current. The control unit is configured for generating a control signal. The switching unit is used for enabling the converter, and conducting the first current to the detecting unit when receiving the control signal. The protection unit is configured for shunting the first current with the detecting unit when the first current becomes a large current surge. The control unit stops generating the control signal when determining that the detected voltage is equal to or higher than a predetermined value.

16 Claims, 2 Drawing Sheets

SWITCHING POWER SUPPLY WITH OVER-CURRENT PROTECTION AND ELECTRONIC DEVICE USING THE SAME

BACKGROUND

1. Field of the Disclosure

Embodiments of the present disclosure relate to switching power supplies, and particularly to a switching power supply of an electronic device.

2. Description of Related Art

Electronic devices such as notebook computers, cellular phones, cordless telephones, mobile data terminals, etc. are now very popular. The operative or rated voltages for most of these electronic devices are direct current (DC) voltage. Switching power supplies may be used to convert AC voltages of the commercial power supply or DC voltages from DC power supplies into corresponding DC operative voltages for the electronic devices.

Typically, a switching power supply includes a switching unit and a control chip for controlling open/close states of the switch unit to further determine when the switching power supply should output an output voltage. The switching power supply may further include a detecting unit for detecting a value of a current flowing through the switch unit and sending the value to a detecting pin of the control chip. When the control chip determines that the value of the current exceeds a predetermined value, the switching unit is turned off, and the switching power supply stops outputting the output voltage.

However, the detecting pin is next to a ground pin of the control chip, and when the control chip soldered to a circuit board, the detecting pin may be shorted to ground via the ground pin. Thus, the detecting pin of the control chip may be short circuited to ground sometimes, and the control chip may not be able to detect current surges. As a result, the control chip may be damaged by a large current surge.

Therefore, an improved switching power supply and an electronic device integrating the switching power supply are needed to address the aforementioned deficiency and inadequacies.

Other advantages and novel features of the present invention will become more apparent from the following detailed description of preferred embodiment when taken in conjunction with the accompanying drawings.

DETAILED DESCRIPTION OF CERTAIN INVENTIVE EMBODIMENTS

References will now be made to the drawings to describe certain inventive embodiments of the present disclosure.

Figure 1:
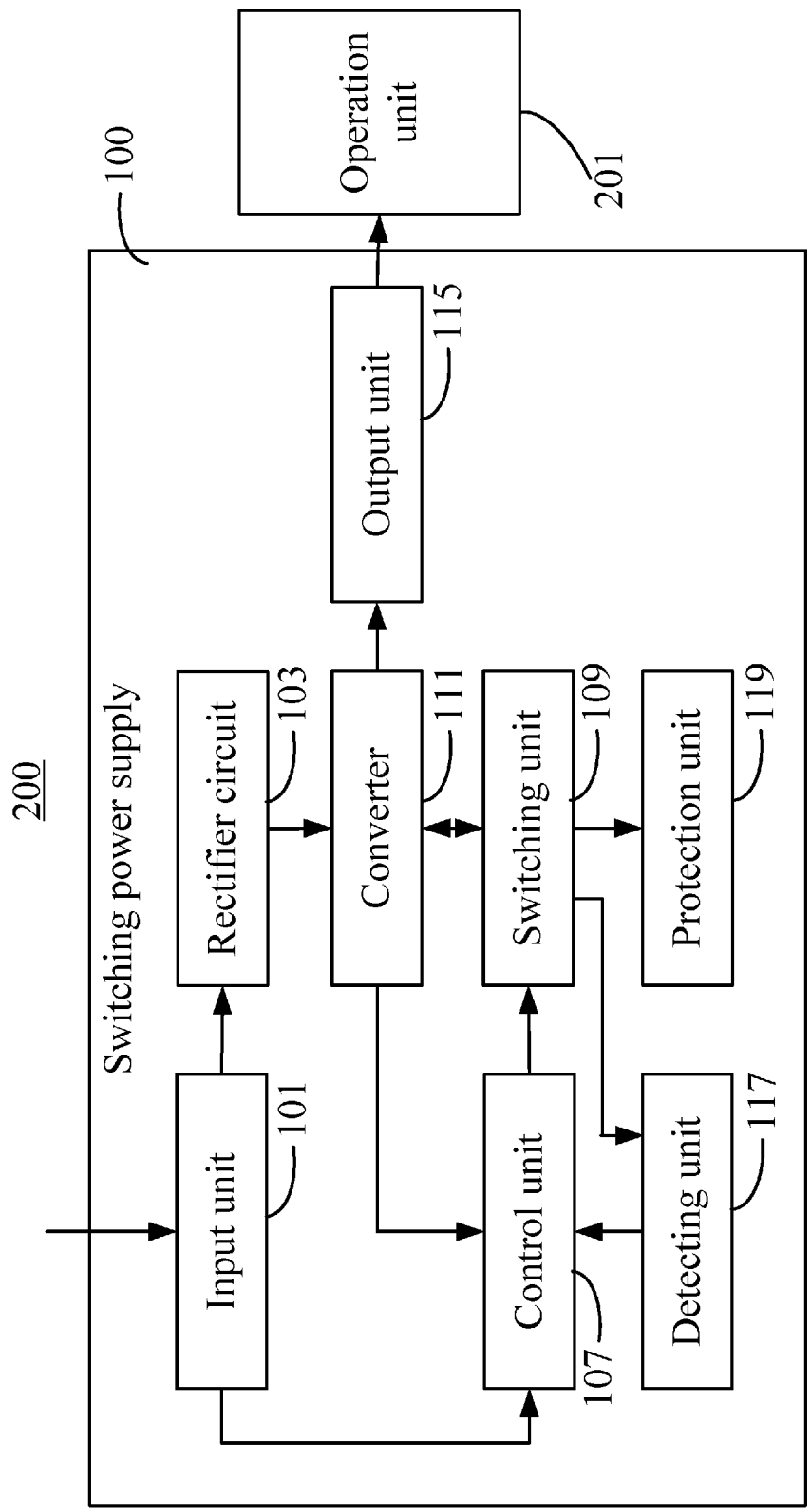
FIG. 1 is a block diagram showing an electronic device in accordance with an embodiment of the present disclosure.

Referring to FIG. 1, an electronic device 200 in accordance with an exemplary embodiment includes a switching power supply 100 and an operation unit 201. The switching power supply 100 is capable of converting an input voltage into an output direct current (DC) voltage to power the operation unit 201. The input voltage may be an alternating current (AC) voltage or a DC voltage.

The switching power supply 100 may include an input unit 101, a rectifier circuit 103, a control unit 107, a switching unit 109, a converter 111, an output unit 115, a detecting unit 117, and a protection unit 119.

The input unit 101 is used for receiving and transmitting or conducting the input voltage to the rectifier circuit 103 and the control unit 107. The input unit 101 may be a power plug which is capable of connecting to the commercial power system or a DC power supply to receive the input voltage. The output unit 115 is used for transmitting or conducting the output DC voltage to the operation unit 201.

The rectifier circuit 103 is configured for converting the input voltage to a first DC voltage, and sending the first DC voltage to the converter 111.

The converter 111 is connected to the rectifier circuit 103, the control unit 107, the output unit 115, and the switching unit 109. The converter 111 is controlled by the control unit 107 via the switching unit 109 to convert the first DC voltage into the output DC voltage, and a second DC voltage. The second DC voltage is used for powering the control unit 107. The converter 111 further generates and sends a first current to the detecting unit 117 via the switching unit 109 controlled by the control unit 107.

Before powered by the converter 111, the control unit 107 is firstly triggered by the input voltage received via the input unit 101, and then generates and sends a control signal to the switching unit 109. The control signal may be a pulse signal. In response to the control signal, the switching unit 109 enables the converter 111 to generate the output DC voltage, the second DC voltage, and the first current.

The detecting unit 117 is configured for generating a detected voltage according to the first current, and sending the detected voltage to a detecting terminal of the control unit 107. The control unit 107 is further configured for determining whether the detected voltage is equal to or higher than a predetermined value. If the detected voltage is equal to or higher than the predetermined value, the control unit 107 stops generating the control signal. Thus the converter 111 stops generating the first current, the output DC voltage, and the second DC voltage, and the detected voltage becomes 0 volts. After a predetermined time interval, the control unit 107 generates the control signal again, and determines whether the detected voltage is equal to or higher than the predetermined value. Therefore, the switching power supply 100 and the operation unit 201 are protected from damage due to large currents or high voltage surges.

The protection unit 119 is connected to the switching unit 109. The protecting unit 119 is capable of protecting the control unit 107 from damage when the detecting terminal of the control unit 107 is short circuited to ground and the first current becomes a large current surge. In the embodiment, the protection unit 119 shunts the first current with the detecting unit 117 when the first current becomes the large current surge. When the first current is so large that the switching unit 109 is breakdown, the protection unit 119 may shunt the first current with the detecting unit 117 and the switching unit 109 to protect the control unit 107.

Figure 2:
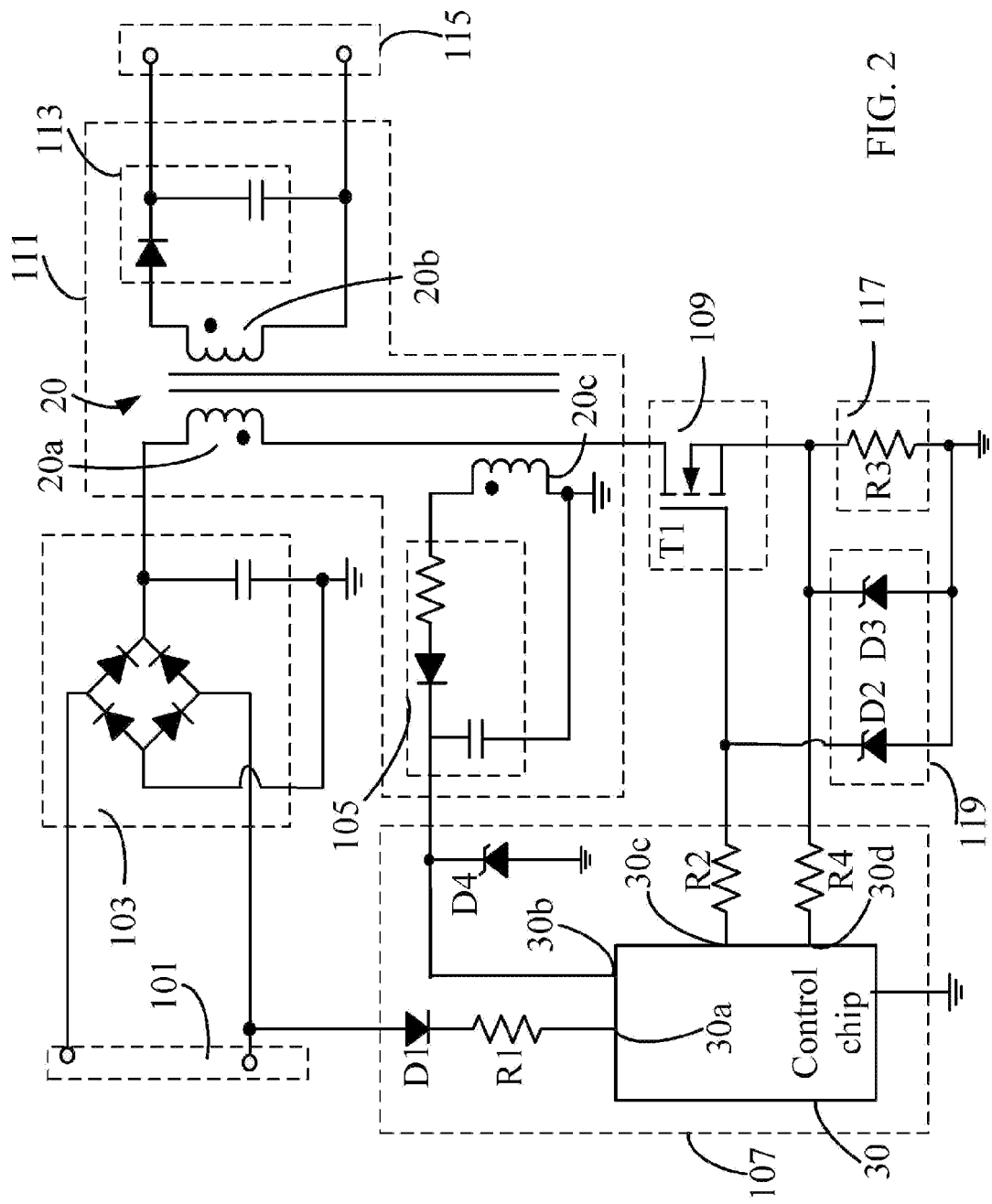
FIG. 2 is a circuit diagram showing a switching power supply in accordance with the embodiment, of FIG. 1, of the present disclosure.

Referring also to FIG. 2, a circuit diagram of the switching power supply 100 is illustrated. In this embodiment, the input unit 101 is a connector including input terminals for receiving the input voltage. The output unit 115 is also a connector including a positive output terminal and a negative output terminal for outputting the output DC voltage. The input voltage is an AC voltage. The rectifier circuit 103 includes a full bridge rectifier and a filter capacitor. The converter 111 includes a transformer 20, a rectifier circuit 113, and a rectifier circuit 105. The transformer 20 includes a primary winding 20a, secondary winding 20b, and secondary winding 20c. A terminal of the primary winding 20a is connected to the rectifier circuit 103, and the other terminal of the primary winding 20a is connected to the switching unit 109 for transmitting the first current. The primary winding 20a is used for generating the first current and a primary voltage. The secondary winding 20b is used for generating a first induced voltage according to the primary voltage. The rectifier circuit 113 is used for rectifying the first induced voltage into the output DC voltage. The rectifier circuit 113 includes a diode and a capacitor, and is connected between the secondary winding 20b and the output unit 115. The secondary winding 20c is used for generating a second induced voltage according to the primary voltage. The rectifier circuit 105 is used for rectifying the second induced voltage into the second DC voltage. The rectifier circuit 105 includes a diode, a resistor, and a capacitor. The rectifier circuit 105 is connected between the secondary winding 20c and the control unit 107.

The switching unit 109 includes a field effect transistor (FET) T1. The FET T1 is an N-Channel enhancement type FET. A source of the FET T1 is connected to the detecting unit 117. A drain of the FET T1 is connected to the other terminal of the primary winding 20a. A gate of the FET T1 configured for receiving the control signal is connected to the control unit 107. The detecting unit 117 includes a resistor R3 connected between the source of the FET T1 and ground.

The control unit 107 includes a control chip 30, a diode D1, a zener diode D4, a resistor R1, a resistor R2, and a resistor R4. The control chip 30 includes a start terminal 30a connected to a terminal of the resistor R1, a power terminal 30b connected to the rectifier circuit 105, a control terminal 30c connected to the gate of the FET T1 via the resistor R2, and the detecting terminal 30d connected to the detecting unit 117 (also the source of the FET T1) via the resistor R4. The zener diode D4 is connected to the power terminal 30b, and is used for protecting the control chip 30 from damage when the second DC voltage becomes a high voltage surge. The other terminal of the resistor R1 is connected to a cathode of the diode D1. An anode of the diode D1 is connected to the input unit 101 for receiving the input voltage. The diode D1 is used for rectifying the input voltage into a third DC voltage to trigger the control chip 30.

The protection unit 119 includes a zener diode D3. A cathode of the zener diode D3 is connected to the source of the FET T1, and an anode of the zener diode D3 is grounded. A zener voltage of the zener diode D3 is higher than the predetermined value. The protection unit 119 may further include a zener diode D2. A cathode of the zener diode D2 is connected to the gate of the FET T1, and an anode of the zener diode D2 is grounded. The zener diode D2 is used for protecting the FET T1 from damage when the control signal becomes equal to or higher than a zener voltage of the zener diode D2.

In operation, when the switching power supply 200 is powered on, the AC input voltage is received via the input unit 101. The AC input voltage is then rectified into the first DC voltage by the rectifier 103. The AC input voltage is also rectified into the third DC voltage to trigger the control chip 30 via the diode D1 and the resistor R1. The control chip 30 sends the control signal (a pulse signal) to the switching unit 109 to control the converter 111 to generate the output DC voltage to power the operation unit 201, the second DC voltage to power the control chip 30, and the first current. The operation unit 201 starts to operate. The detected voltage is generated and detected by the control chip 30. When the first current becomes a large current, the detected voltage may become equal to or higher than the predetermined value. The control chip 30 stops generating the control signal, and the converter 111 stops operating. Therefore, the switching power supply 100 and the operation unit 201 are protected from damaged by the large current. After the predetermined time interval, the control chip 30 is triggered again by the third DC voltage, and the converter 111 starts operating.

If the detecting terminal 30d of the control chip 30 is short circuited to ground, the control chip 30 cannot receive the detected voltage. When an input current become a large current surge, or other conditions to cause the first current to become the large current surge, the detected voltage on the resistor R3 may be equal to or larger than the zener voltage of the zener diode D3, the zener diode D3 turns on and keeps the detected voltage at the zener voltage. As a result, a current flowing through the drain and source of the FET T1 is shunted by the resistors R3, R4, and the zener diode D3. Thus the resistor R3 is protected from damage. When the first current reaches such a dangerous level that the FET T1 is breakdown and damaged, the zener diode D2 may also turn on, thus a large current flowing through the drain and gate of the breakdown-FET T1 may be conducted to ground by the zener diode D2. Thus, the control chip 30 is protected from damage due to the large current.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A switching power supply, comprising:
    a rectifier circuit for rectifying an input voltage into a first direct current voltage;
    a converter for generating a first current according to the first direct current voltage;
    a detecting unit for generating a detected voltage according to the first current;
    a control unit for generating a control signal;
    a switching unit for enabling the converter, and conducting the first current to the detecting unit when receiving the control signal; and
    a protection unit for comparing the detected voltage with a zener voltage and conducting the first current to ground when the detected voltage is equal to or higher than the zener voltage;
    wherein the switching unit is not disabled when the protection unit shunts the first current, the control unit stops generating the control signal when determining that the detected voltage is equal to or higher than a predetermined value;
    wherein the protection unit is further configured for shunting the first current with the detecting unit and the switching unit when the first current becomes so large to breakdown the switching unit, the protection unit operates when the control unit is short circuited to ground.

2. The switching power supply as claimed in claim 1, further comprising an input unit for receiving the input voltage, and conducting the input voltage to the rectifier circuit.

3. The switching power supply as claimed in claim 1, wherein the control unit is triggered by the input voltage and consequently generates the control signal, the converter is further configured for generating a second direct current voltage to power the control unit according to the first direct current voltage.

4. The switching power supply as claimed in claim 3, wherein the converter is further configured for generating an output direct current voltage to power an operation unit according to the first direct current voltage.

5. The switching power supply as claimed in claim 4, further comprising an output unit for receiving the output direct current voltage and outputting the output direct current voltage.

6. The switching power supply as claimed in claim 1, wherein the control unit comprises a detecting terminal connected with the detecting unit, the protection unit operates when the detecting terminal is short circuited to ground.

7. The switching power supply as claimed in claim 6, wherein the switching unit comprises a field effect transistor comprising a source connected to the detecting unit and the detecting terminal, a drain connected to the converter, and a gate connected to the control unit for receiving the control signal.

8. The switching power supply as claimed in claim 7, wherein the detecting unit comprises a resistor comprising a terminal connected to the source of the field effect transistor and the detecting terminal, another terminal grounded.

9. The switching power supply as claimed in claim 8, wherein the protection unit comprises a first zener diode comprising a cathode connected to the source of the field effect transistor, and an anode grounded.

10. The switching power supply as claimed in claim 9, wherein the protection unit further comprises a second zener diode comprising a cathode connected to the gate of the field effect transistor, and an anode grounded.

11. The switching power supply as claimed in claim 1, wherein the input voltage is an alternating current voltage, the rectifier circuit comprises a full bridge rectifier and a filter capacitor.

12. The switching power supply as claimed in claim 4, wherein the converter comprises a transformer, a second rectifier circuit, and a third rectifier circuit, the transformer is configured for generating the first current, a primary voltage, a first induced voltage, and a second induced voltage, the second rectifier circuit is used for rectifying the first induced voltage to the output direct current voltage, the third rectifier circuit is used for rectifying the second induced voltage to the second direct current voltage.

13. An electronic device, comprising:
an operation unit; and
a switching power supply comprising:
  a rectifier circuit for rectifying an input voltage to a first direct current voltage;
  a converter for generating an output direct current voltage for powering the operation unit, and a first current according to the first direct current voltage;
  a detecting unit for generating a detected voltage according to the first current;
  a control unit for generating a control signal;
  a switching unit for enabling the converter, and conducting the first current to the detecting unit when receiving the control signal; and
  a protection unit for comparing the detected voltage with a zener voltage and conducting the first current to ground when the detected voltage is equal to or higher than the zener voltage;
  wherein the switching unit is not disabled when the protection unit shunts the first current, the control unit stops generating the control signal when determining that the detected voltage is equal to or higher than a predetermined value;
  wherein the protection unit is further configured for shunting the first current with the detecting unit and the switching unit when the first current becomes so large to breakdown the switching unit, the control unit comprises a detecting terminal connected with the detecting unit, the protection unit operates when the detecting terminal is short circuited to ground.

14. The electronic device as claimed in claim 13, further comprising an input unit for receiving the input voltage, and conducting the input voltage to the rectifier circuit.

15. The electronic device as claimed in claim 13, wherein the control unit is actuated by the input voltage and consequently generates the control signal, the converter is further configured for generating a second direct current voltage to power the control unit according to the first direct current voltage.

16. The electronic device as claimed in claim 13, further comprising an output unit for transmitting the output direct current voltage to the operation unit.

* * * * *